United States Patent [19]
Hamilton, Jr. et al.

[11] Patent Number: 5,629,734
[45] Date of Patent: May 13, 1997

[54] ADAPTIVE COLOR PLAN INTERPOLATION IN SINGLE SENSOR COLOR ELECTRONIC CAMERA

[75] Inventors: John F. Hamilton, Jr.; James E. Adams, Jr., both of Rochester, N.Y.

[73] Assignee: Eastman Kodak Company, Rochester, N.Y.

[21] Appl. No.: 407,423

[22] Filed: Mar. 17, 1995

[51] Int. Cl.$^6$ .............................. H04N 5/228; H04N 9/07
[52] U.S. Cl. ..................... 348/222; 348/266; 348/272
[58] Field of Search .................................. 348/222, 231, 348/266, 272, 273, 233; H04N 5/228, 9/07

[56] References Cited

U.S. PATENT DOCUMENTS

| | | | |
|---|---|---|---|
| 3,971,065 | 7/1976 | Bayer | 358/41 |
| 4,642,678 | 2/1987 | Cok | 358/44 |
| 5,373,322 | 12/1994 | Laroche et al. | 348/273 |
| 5,382,976 | 1/1995 | Hibbard | 348/273 |

*Primary Examiner*—Sherrie Hsia
*Attorney, Agent, or Firm*—Raymond L. Owens

[57] ABSTRACT

Apparatus is described for processing a digitized image signal obtained from an image sensor having color photosites aligned in rows and columns that generate at least three separate color values but only one color value for each photosite location, structure for interpolating color values for each photosite location so that it has three different color values. The apparatus includes a memory for storing the digitized image signal and a processor operative with the memory for generating an appropriate color value missing from a photosite location by the interpolation of an additional color value for such photosite locations from color values of different colors than the missing color value at nearby photosite locations. The processor also includes structure for obtaining Laplacian second-order values and gradient values in at least two image directions from nearby photosites of the same column and row and for adding the Laplacian second-order values and the gradient values to define a classifier and for selecting a preferred orientation for the interpolation of the missing color value based upon a classifier. Finally, an arrangement is provided for interpolating the missing color value from nearby multiple color values selected to agree with the preferred orientation.

14 Claims, 5 Drawing Sheets

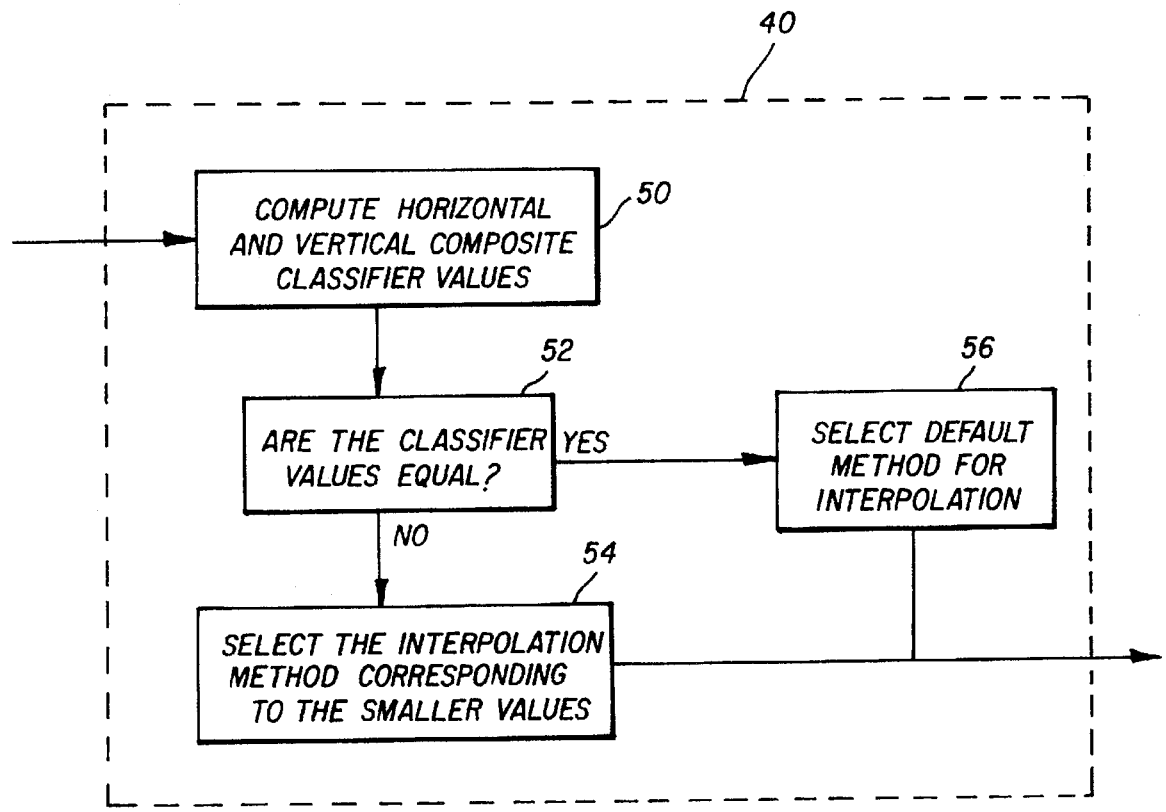

ADAPTIVE COLOR PLAN INTERPOLATION IN SINGLE SENSOR COLOR ELECTRONIC CAMERA

CROSS REFERENCE TO RELATED APPLICATIONS

Reference is made to commonly assigned U.S. Ser. No. 08/407,436 filed Mar. 17, 1995, issued as U.S. Pat. No. 5,506,619 on Apr. 9, 1996 to James E. Adams, Jr. and John F. Hamilton, Jr. filed concurrently herewith, the teachings of which are incorporated herein.

FIELD OF THE INVENTION

This invention relates to the field of electronic imaging and is particularly suitable to electronic still imaging by means of an electronic still camera having a single color sensor and memory.

BACKGROUND OF THE INVENTION

In electronic color imaging, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of sensors that are covered by a pattern of red, green and blue filters. This type of sensor is known as a color filter array or CFA. Below is shown the red (R), green (G) and blue (B) pixels as are commonly arranged on a CFA sensor.

When a color image is captured using a CFA, it is necessary to interpolate the red, green and blue values so that there is an estimate of all three color values for each sensor location. Once the interpolation is done, each picture element, or pixel, has three color values and can be processed by a variety of known image processing techniques depending on the needs of the system. Some examples of the reasons for processing are to do image sharpening, color correction or halftoning.

The following shows how red green and blue pixels can be arranged in a color filter array. For a more detailed description see U.S. Pat. No. 3,971,065 to Bayer.

```
G R G R
B GB G
G R G R
B GB G
```

SUMMARY OF INVENTION

The object of this invention is to provide an improved apparatus for estimating the missing pixel values in a CFA.

This object is achieved in apparatus for processing a digitized image signal obtained from an image sensor having color photosites aligned in rows and columns that generate at least three separate color values but only one color value for each photosite location, means for interpolating color values for each photosite location so that it has three different color values comprising:

means for storing the digitized image signal;

a processor operative with said storing means for generating an appropriate color value missing from a photosite location by the interpolation of an additional color value for such photosite locations from color values of different colors than the missing color value at nearby photosite locations, said processor including means for obtaining Laplacian second-order values and gradient values in at least two image directions from nearby photosites of the same column and row;

means for adding the Laplacian second-order values and the gradient values to define a classifier and for selecting a preferred orientation for the interpolation of the missing color value based upon a classifier; and means for interpolating the missing color value from nearby multiple color values selected to agree with the preferred orientation.

Advantages

The advantages of this invention are 1) is computationally efficient both in execution time and memory storage requirements; and 2) by use of the combination of the Laplacian second-order values and the gradient values to produce a classifier, artifacts (color interpolation) in output image are substantially reduced.

DETAILED DESCRIPTION OF THE INVENTION

Since single-sensor electronic cameras employing color filter arrays are well known, the present description will be directed in particular to elements forming part of, or cooperating more directly with, apparatus and method in accordance with the present invention. Elements not specifically shown or described herein may be selected from those known in the art.

Figure 1:
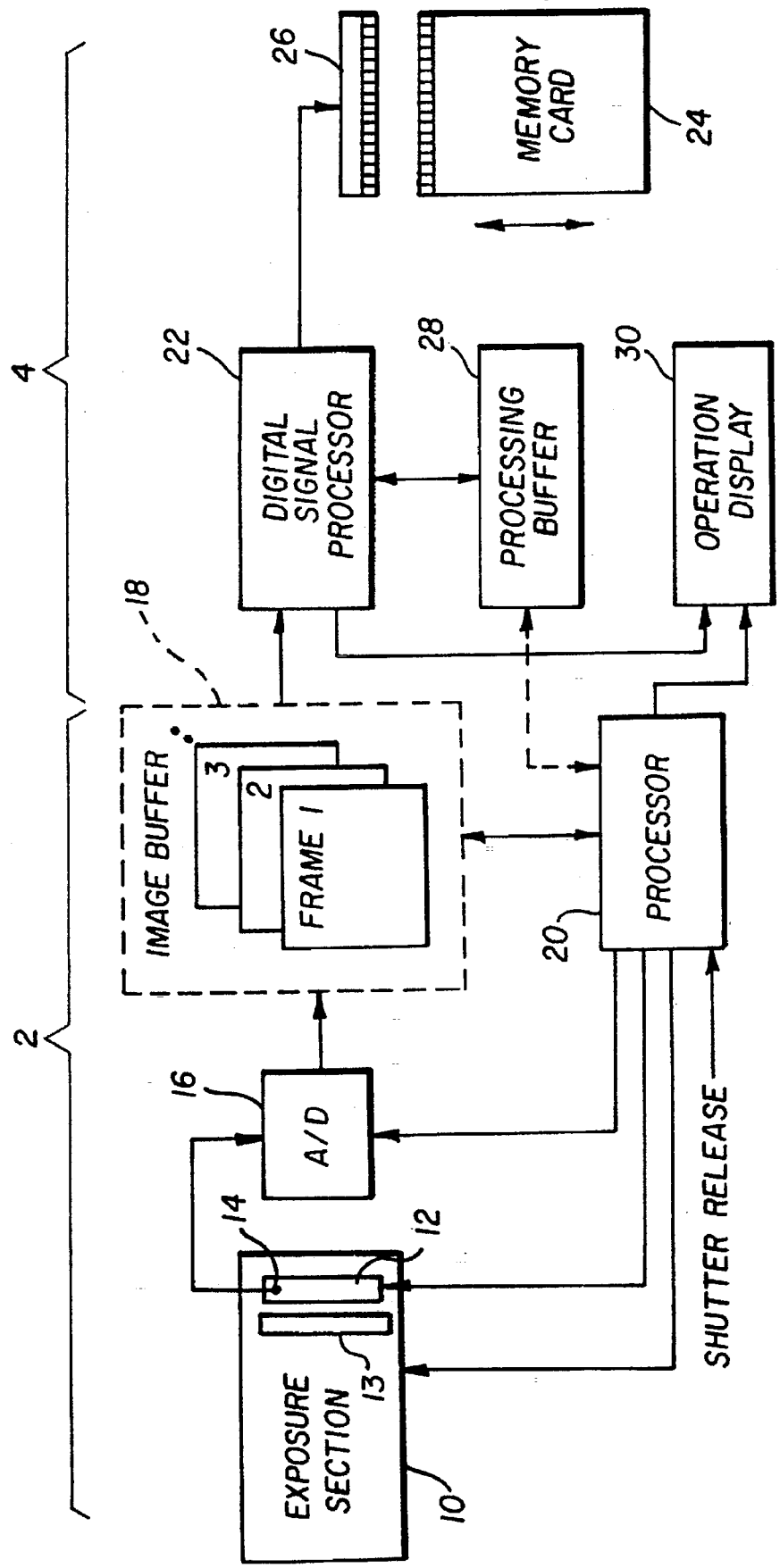
FIG. 1 is a block diagram of an electronic still camera employing interpolation processing according to the invention.
Figure 2:
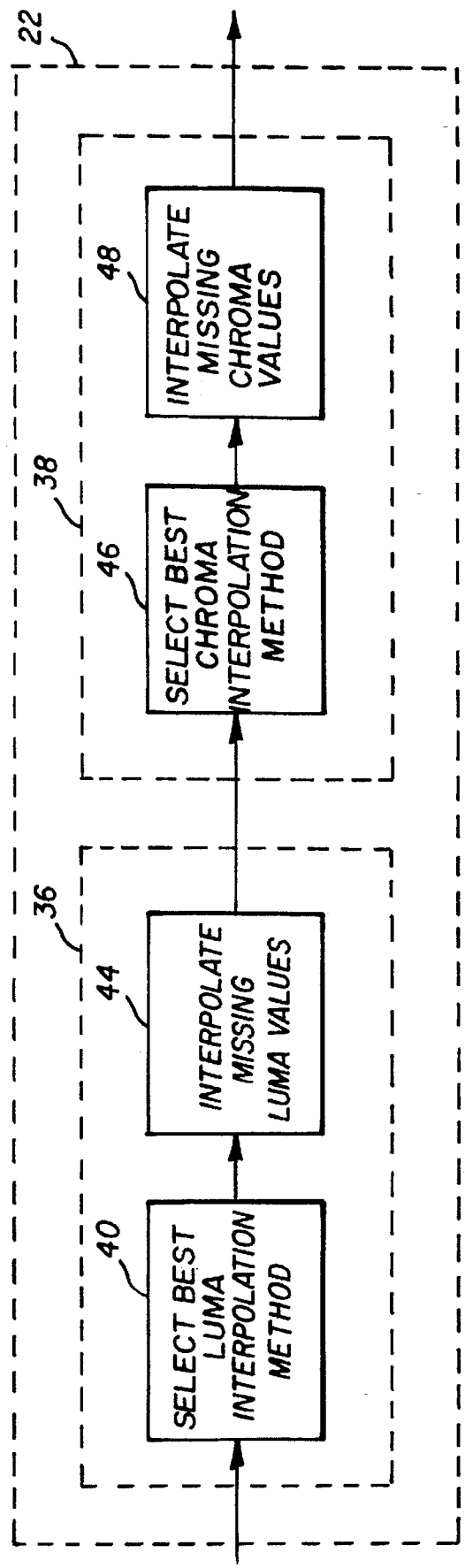
FIG. 2 is a block diagram of the logic of the interpolation processing technique used in connection with the invention.

Referring initially to FIGS. 1 and 2, an electronic still camera is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of photosites corresponding to picture elements of the image, is a conventional charge-coupled device (CCD) using either well-known interline transfer or frame transfer techniques. The image sensor 12 is covered by a color filter array (CFA) 13, known as the Bayer array, which is described in U.S. Pat. No. 3,971,065 and herewith incorporated by reference. In the Bayer geometry each color covers a photosite, or picture element (pixel), of the sensor. In particular, chrominance colors (red and blue) are interspersed among a checkerboard pattern of luminance colors (green). The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element. The digital signals are applied to an image buffer 18, which may be a random access memory (RAM) with storage capacity for a plurality of still images.

A control processor 20 generally controls the input section 2 of the camera by initiating and controlling exposure (by operation by the diaphragm and shutter (not shown) in the exposure section 10), by generating the horizontal and vertical clocks needed for driving the image sensor 12 and for clocking image information therefrom, and by enabling the A/D converter 16 in conjunction with the image buffer 18 for each signal segment relating to a picture element. (The control processor 20 would ordinarily include a microprocessor coupled with a system timing circuit.) Once a certain number of digital image signals have been accumulated in the image buffer 18, the stored signals are applied to a digital signal processor 22, which controls the throughput processing rate for the interpolation and recording section 4 of the camera. The digital signal processor 22 applies an interpolation algorithm to the digital image signals, and sends the interpolated signals to a conventional, removable memory card 24 via a connector 26.

Since the interpolation and related processing ordinarily occurs over several steps, the intermediate products of the processing algorithm are stored in a processing buffer 28. (The processing buffer 28 may also be configured as part of the memory space of the image buffer 18.) The number of image signals needed in the image buffer 18 before digital processing can begin depends on the type of processing, that is, for a neighborhood interpolation to begin, a block of signals including at least a portion of the image signals comprising a video frame must be available. Consequently, in most circumstances, the interpolation may commence as soon as the requisite block of picture elements is present in the buffer 18.

The input section 2 operates at a rate commensurate with normal operation of the camera while interpolation, which may consume more time, can be relatively divorced from the input rate. The exposure section 10 exposes the image sensor 12 to image light for a time period dependent upon exposure requirements, for example, a time period between 1/1000 second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the camera. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of camera is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2; that is, first, the high frequency information for the "missing green" pixels (i.e., the red and blue pixel locations) are interpolated to improve the luminance rendition and, secondly, the color difference information is interpolated at the high frequency locations by bilinear methods to generate the other colors of the CFA pattern. In the implementation shown in FIG. 2, an adaptive interpolation technique is used in the luminance section 36 for optimizing the performance of the system for images with horizontal and vertical edges. "Missing green" pixels are adaptively interpolated either horizontally, vertically or two-dimensionally depending upon the gradient established between the chrominance (red and blue) pixel locations in the vertical and horizontal directions around the "missing green" pixel.

Figure 3:
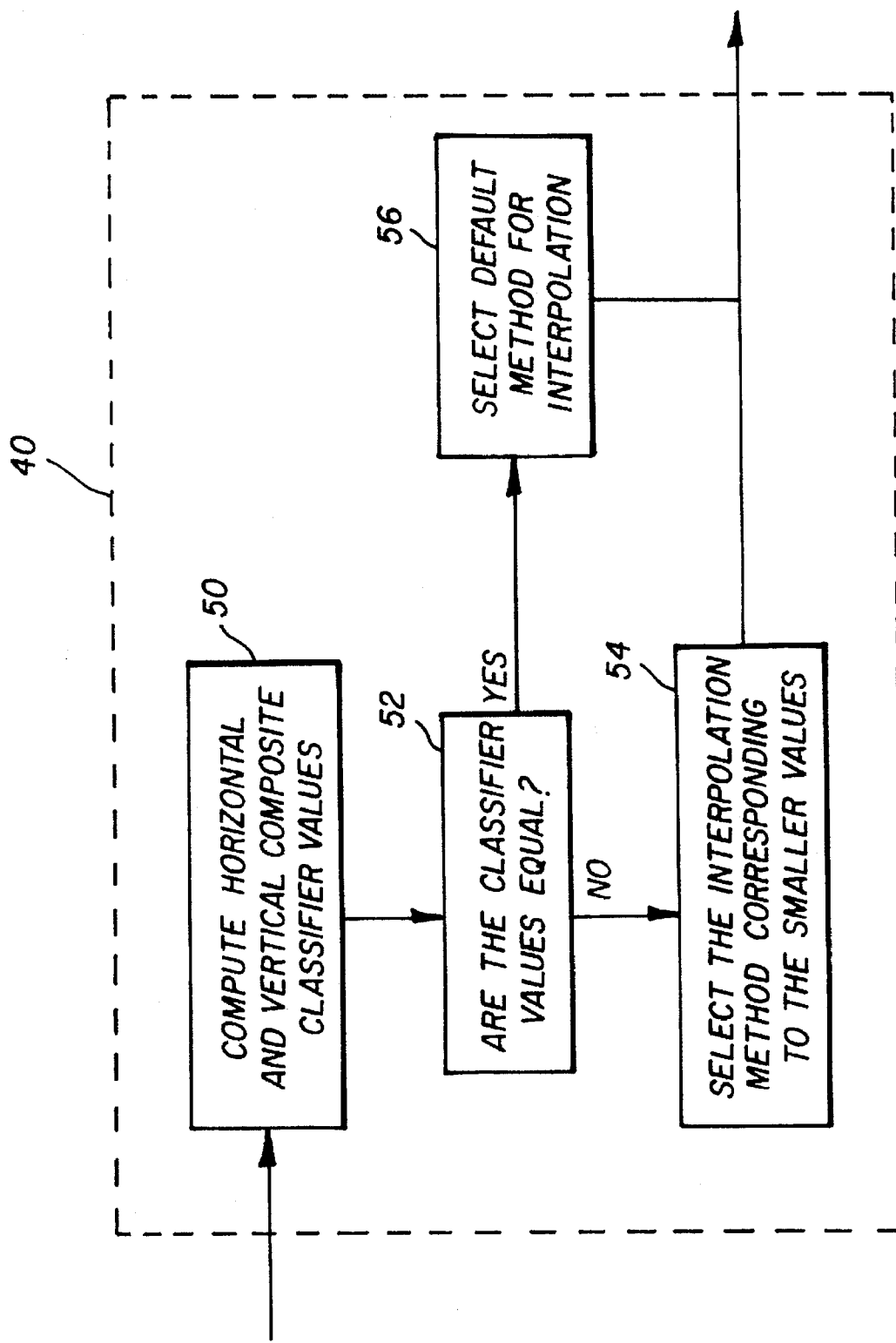
FIG. 3 is a detailed block diagram of the logic of the interpolation luminance section in FIG. 2.

The first step for adaptively interpolating the "missing green" pixels is to select an interpolation method. The details of this process are shown in block 40 of FIG. 3. The process starts by computing two composite pixel classifier values (Block 50), one for the horizontal direction and one for the vertical. The term "pixel classifier" denotes a value computed for the purpose of making a decision about further processing of the pixel information. The term "composite" denotes the dependency of the value on a multiplicity of color planes. In this case, the absolute value of the Laplacian of the green plane is added to the absolute value of the gradient of the red or blue plane, depending on which was the corresponding color in the Bayer color filter array.

The two classifier values are the compared (Block 52) and tested for equality. In the likely event that one value is smaller than the other, the interpolation method corresponding to the smaller value is selected (Block 54). If the values are equal, then the default interpolation method is selected (Block 56). In either case Block 40 is done.

Figure 4:
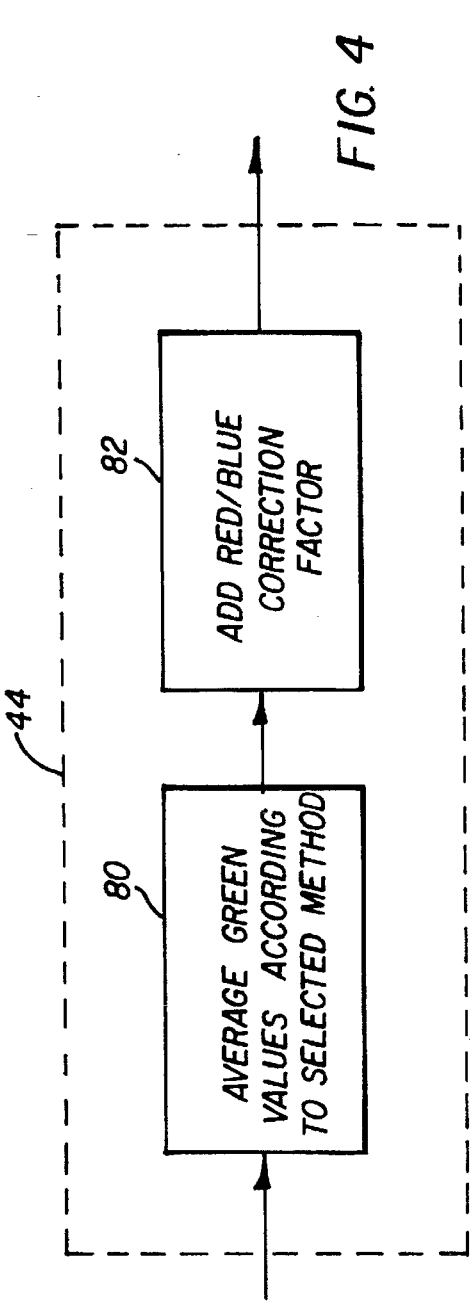
FIG. 4 is a more detailed block diagram of the logic of the chrominance section in FIG. 2.

The green (luma) interpolation step (Block 44) has two parts, as shown in FIG. 4. The first part (Block 80) averages the two luminance (green) values according to the selected interpolation method. The second part (Block 82) adds a correction factor based on either red or blue neighboring values depending on if the pixel in question was covered by a red or blue filter in the Bayer color filter array.

Figure 5:
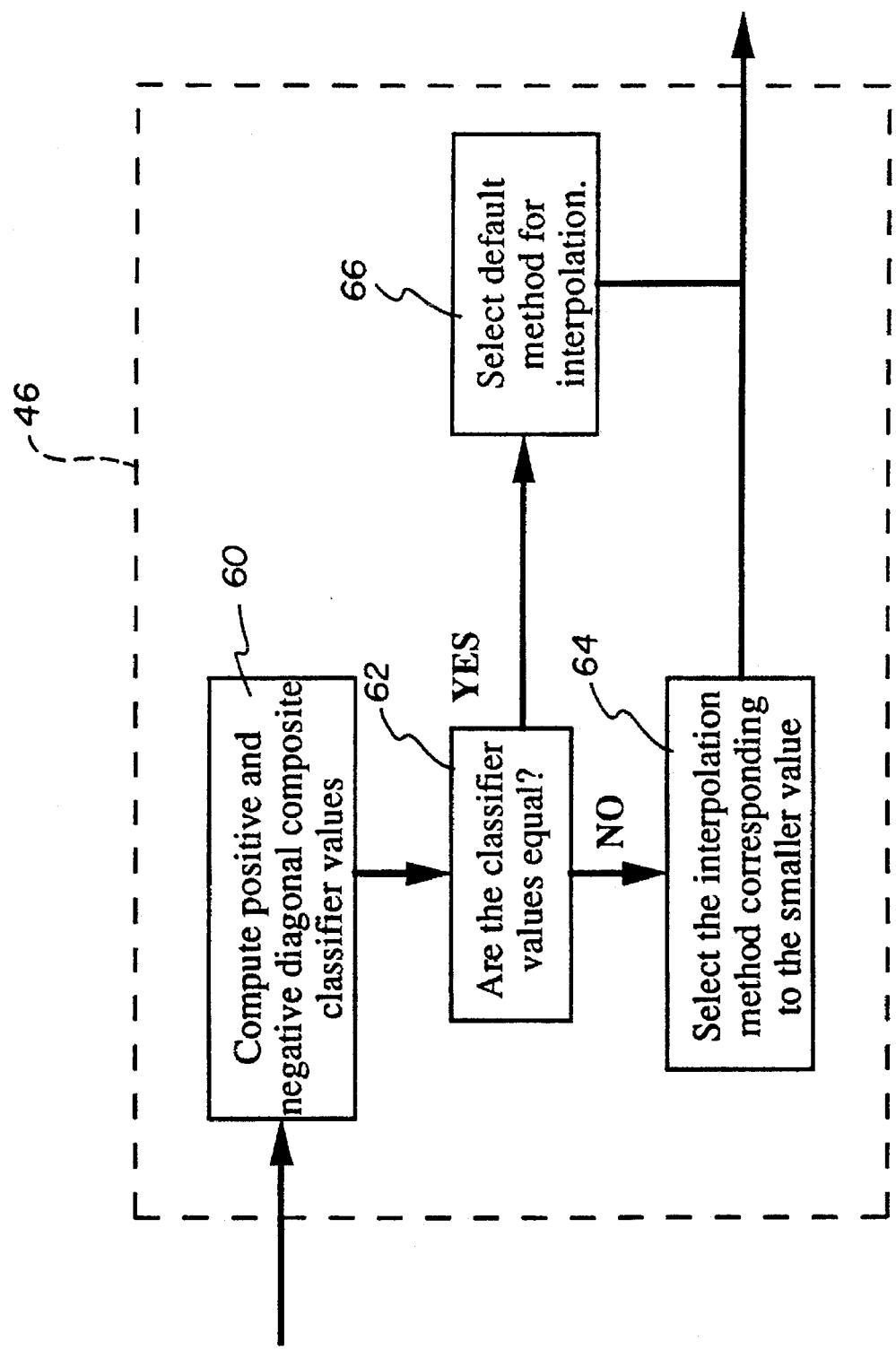
FIGS. 5 and 6 show logic block diagrams for the interpolation processes in accordance with the invention.

The red/blue (chroma) interpolation proceeds in a manner similar to the green (luma) interpolation described above. The details of this process are shown in Block 46 of FIG. 5. The process starts by computing two composite pixel classifier values (Block 60), one for the negative diagonal direction and one for the positive diagonal. The term "negative diagonal" denotes the line of slope −1 (connecting the upper left to the lower right). The term "positive diagonal" denotes the line of slope +1 (connecting the lower left to the upper right). Again, these composite classifiers are found by adding the absolute value of the Laplacian in the green plane to the absolute value of the gradient in either the red or blue plane, depending on which color is being interpolated.

The two classifier values are then compared (Block 62) and tested for equality. In the likely event that one value is smaller than the other, the interpolation method corresponding to the smaller value is selected (Block 64). If the values are equal, then the default interpolation method is selected (Block 66). In either case Block 46 is done.

Figure 6:
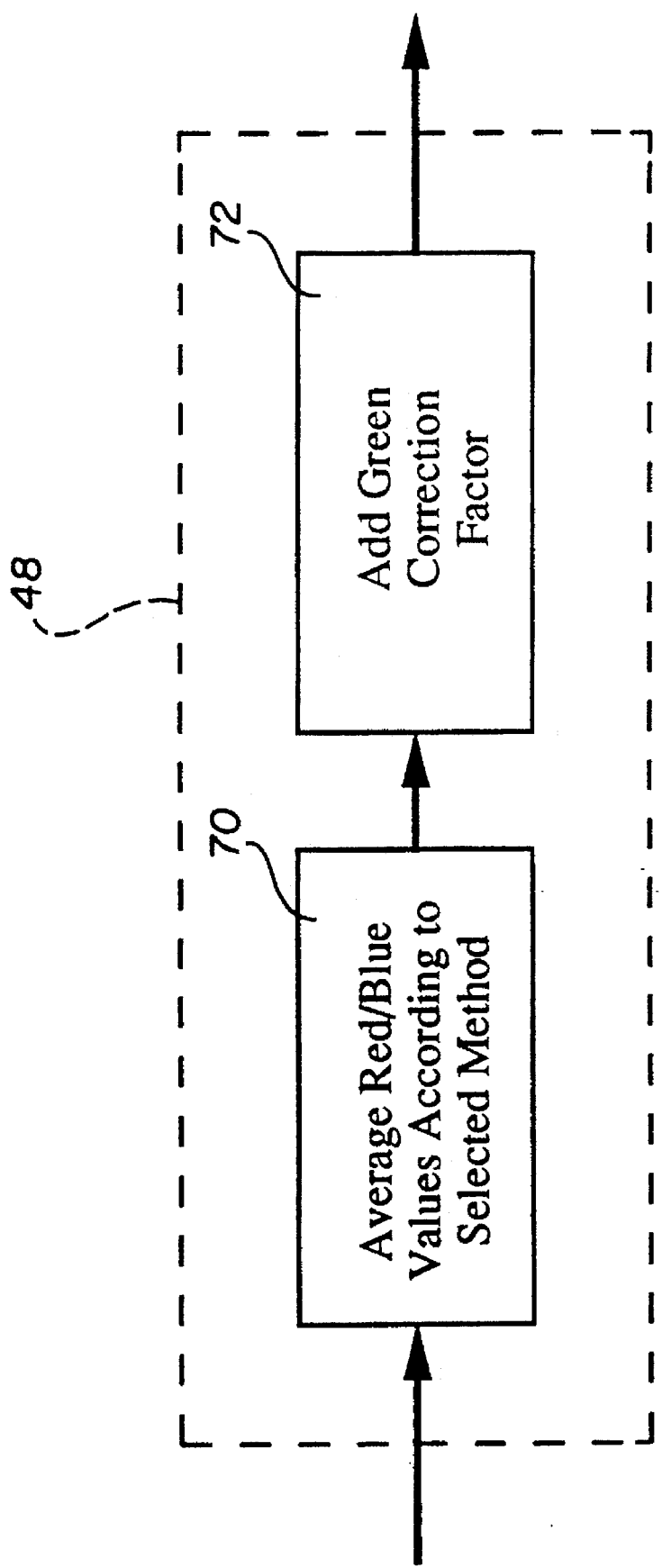

The red/blue (chroma) interpolation step (Block 48) has two parts, as shown in FIG. 6. In the first part (Block 70) two chrominance values, either red or blue depending on the pixel's position in the Bayer color filter array, are averaged according to the selected interpolation method. The second part (Block 72) adds a correction factor based on green neighboring values.

More specifically, the following is a detailed description of the operation of the digital signal processor for a specific example using the Bayer array.

Green Plane Interpolation

The first pass of the interpolation fully populates the green color plane. The Bayer color filter array is assumed. Consider the following neighborhood.

$$\begin{array}{c} A1 \\ G2 \\ A3\ G4\ A5\ G6\ A7 \\ G8 \\ A9 \end{array}$$

Gx is a green pixel and Ax is either a red pixel or a blue pixel. (All Ax pixels will be the same color for the entire neighborhood.) For simplicity, we will use the term "chroma" to mean either red or blue. We form the following classifiers.

$$DH = |-A3 + 2A5 - A7| + |G4 - G6|$$

$$DV = |-A1 + 2A5 - A9| + |G2 - G8|$$

These classifiers are composed of Laplacian second-order terms for the chroma data and gradients for the green data. As such, these classifiers are sensing the high spatial frequency information present in the pixel neighborhood in the horizontal (DH) and vertical (DV) directions.

We then form three predictors.

$$G5H = (G4 + G6)/2 + (-A3 + 2A5 - A7)/4$$

$$G5V = (G2 + G8)/2 + (-A1 + 2A5 - A9)/4$$

$$G5A = (G2 + G4 + G6 + G8)/4 + (-A1 - A3 + 4A5 - A7 - A9)/8$$

These predictors are composed of arithmetic averages for the green data and appropriately scaled Laplacian second-order terms for the chroma data. G5H is to be used when the preferred orientation for the interpolation is in the horizontal direction within the pixel neighborhood. Similarly, G5V is to be used when the preferred orientation for the interpolation is the vertical direction. G5A is used when there is no clear preference for orientation for the interpolation.

The complete green interpolation process may now be expressed as below.

```
IF DH < DV
    THEN G5 = G5H
    ELSE IF DV < DH
        THEN G5 = G5V
        ELSE G5 = G5A
```

The key to this process is that both the green and the chroma data must indicate a minimum of high spatial frequency information for a given orientation to be chosen as the preferred orientation for the interpolation. If there is a large amount of high spatial frequency information in either the green data or chroma data for a given orientation, it will inflate the value of the corresponding classifier. This, in turn, reduces the likelihood for that orientation to be chosen as the preferred orientation for the interpolation.

In practice, the green interpolation process may be simplified, as below, for computational efficiency.

```
IF DH <= DV
    THEN G5 = G5H
    ELSE G5 = G5V
```

This simplification is achieved by defining the horizontal direction as the default preferred orientation for the interpolation when both horizontal and vertical classifiers are equal. The number of occurrences in a typical image when the horizontal and vertical classifiers are equal is so small that this simplification generally has negligible impact on the image quality of the final reconstructed image.

Red and Blue (Chroma) Interpolation

The second pass of the interpolation fully populates the red and blue color planes. In U.S. Pat. No. 4,642,678, issued Feb. 10, 1987, Cok (the disclosure of which is incorporated by reference herein) disclosed the chroma interpolation summarized below. Consider the following neighborhood.

$$\begin{array}{c} A1\ G2\ A3 \\ G4\ C5\ G6 \\ A7\ G8\ A9 \end{array}$$

Gx is a green pixel, Ax is either a red or blue pixel and C5 is the opposite color pixel to Ax (i.e., if Ax is red then C5 is blue and visa versa). Note that all Gx pixels, G1 through G9, are assumed to be known and coincident with all corresponding Ax and C5 pixels.

There are three cases. Case 1 is when the nearest neighbors to Ax are in the same column. The following predictor is used. (A4 is used as an example.)

$$A4 = (A1 + A7)/2 + (-G1 + 2G4 - G7)/2$$

Case 2 is when the nearest neighbors to Ax are in the same row. The following predictor is used. (A2 is used as an example.)

$$A2 = (A1 + A3)/2 + (-G1 + 2G2 - G3)/2$$

Case 3 is when the nearest neighbors to Ax are at the four coners. The following predictor is used. (A5 is used as an example.)

$$A5 = (A1 + A3 + A7 + A9)/4 + (-G1 - G3 + 4G5 - G7 - G9)/4$$

We describe an improvement for case 3. We form the following two classifiers.

$$DN = |-G1 + 2G5 - G9| + |A1 - A9|$$

DP=|−G3+2G5−G7|+|A3−A7|

These classifiers are composed of Laplacian second-order terms for the green data and gradients for the chroma data. As such, these classifiers are sensing the high spatial frequency information present in the pixel neighborhood in the negative diagonal (DN) and positive diagonal (DP) directions.

We then form three predictors.

A5N=(A1+A9)/2+(−G1+2G5−G9)/2

A5P=(A3+A7)/2+(−G3+2G5−G7)/2

A5A=(A1+A3+A7+A9)/4+(−G1−G3+4G5−G7−G9)/4

These predictors are composed of arithmetic averages for the chroma data and appropriately scaled Laplacian second-order terms for the green data. A5N is to be used when the preferred orientation for the interpolation is in the negative diagonal direction within the pixel neighborhood. Similarly, A5P is to be used when the preferred orientation for the interpolation is the positive diagonal direction. A5A is used when there is no clear preference for orientation for the interpolation.

The complete case 3 chroma interpolation process may now be expressed as below.

```
IF DN < DP
    THEN A5 = A5N
    ELSE IF DP < DN
        THEN A5 = A5P
        ELSE A5 = A5A
```

In this process both the green and the chroma data must indicate a minimum of high spatial frequency information for a given orientation to be chosen as the preferred orientation for the interpolation. If there is a large amount of high spatial frequency information in either the green data or chroma data for a given orientation, it will inflate the value of the corresponding classifier. This, in turn, reduces the likelihood for that orientation to be chosen as the preferred orientation for the interpolation.

In practice, the case 3 chroma interpolation process may be simplified, as below, for computational efficiency.

```
IF DN <= DP
    THEN A5 = A5N
    ELSE A5 = A5P
```

This simplification is achieved by defining the negative diagonal direction as the default preferred orientation for the interpolation when both negative and positive diagonal classifiers are equal. The number of occurrences in a typical image when the negative and positive diagonal classifiers are equal is so small that this simplification generally has negligible impact on the image quality of the final reconstructed image.

The invention has been described in detail with particular reference to certain preferred embodiments thereof, but it will be understood that variations and modifications can be effected within the spirit and scope of the invention.

Parts List 2 input section
4 recording section
10 exposure section
12 image sensor
13 color filter array
14 output diode
16 A/D converter
18 image buffer
20 control processor
22 digital signal processor
24 removable memory card
26 connector
28 processing buffer
30 display panel
36 luminance section
38 chroma section
40 select best luma interpolation
44 interpolate missing luma values
46 select best chroma interpolation
48 interpolate missing chroma values
50 compute horizontal and vertical composite classifier values
52 classifier test
54 select the interpolation method corresponding to the smaller value
56 select default method for interpolation
60 block
62 block
64 block
66 block
70 average red/blue values
72 add green correction factor
80 block
82 block

We claim:

1. In apparatus for utilizing a digitized image signal obtained from an image sensor having color photosites aligned in rows and columns that generate at least three separate color values but only one color value for each photosite location, said apparatus including means for interpolating the color values for each photosite location so that each photosite has the three separate color values, said means for interpolating the color values comprising:

means for storing the digitized image signal;

a processor operative with said storing means for generating an appropriate color value missing from a photosite location by the interpolation of an additional color value for such photosite locations from color values of different colors than the missing color value at nearby photosite locations, said processor including means for obtaining Laplacian second-order values and gradient values in at least two image directions from nearby photosites of the same column and row;

means for adding the Laplacian second-order values and the gradient values to define a classifier and for selecting a preferred orientation for the interpolation of the missing color value based upon the classifier; and means for interpolating the missing color value from nearby multiple color values selected to agree with the preferred orientation.

2. In apparatus for processing a digitized image signal obtained from an image sensor having red, green, and blue color photosites aligned in rows and columns that generate at least three separate color values but only one color value for each photosite location, said apparatus including means for interpolating the color values for each photosite location so that each photosite has the three separate color values, said means for interpolating comprising:

means for storing the digitized image signal;

a processor operative with said storing means for generating an appropriate color value missing from a photosite location by the interpolation of an additional color value for such photosite locations from color values of different colors than the missing color value at nearby photosite locations, said processor including means for obtaining Laplacian second-order values and gradient values in at least two image directions from nearby photosites of the same column and row;

means for adding the Laplacian second-order values and the gradient values to define a classifier and for selecting a preferred orientation for the interpolation of the missing color value based upon the classifier; and means for interpolating the missing color value from nearby multiple color values selected to agree with the preferred orientation wherein neighboring color values of the same color are averaged and corrected by neighboring color values of a different color value.

3. The apparatus of claim 1 wherein, when the preferred orientation is horizontal, a color site is red, and the missing color value is green, adjacent horizontal green color values are averaged and horizontal red color values including a red color site value provide a correction value.

4. The apparatus of claim 1 wherein, when the preferred orientation is horizontal, a color site is blue, and the missing color value is green, adjacent horizontal green color values are averaged and horizontal blue color values including a blue color site value provide a correction value.

5. The apparatus of claim 1 wherein, when the preferred orientation is horizontal, a color site is green, and the missing color value is red, adjacent horizontal red color values are averaged and horizontal green color values including a green color site value provide a correction value.

6. The apparatus of claim 1 wherein, when the preferred orientation is horizontal, a color site is green, and the missing color value is blue, adjacent horizontal blue color values are averaged and horizontal green color values including a green color site value provide a correction value.

7. The apparatus of claim 1 wherein, when the preferred orientation is negative diagonal, a color site is green, and the missing color value is red, adjacent negative diagonal red color values are averaged and negative diagonal green color values including a green color site value provide a correction value.

8. The apparatus of claim 1 wherein, when the preferred orientation is negative diagonal, a color site is green, and the missing color value is blue, adjacent negative diagonal blue color values are averaged and negative diagonal green color values including a green color site value provide a correction value.

9. The apparatus of claim 1 wherein, when the preferred orientation is vertical, a color site is red, and the missing color value is green, adjacent vertical green color values are averaged and vertical red color values including a red color site value provide a correction value.

10. The apparatus of claim 1 wherein, when the preferred orientation is vertical, a color site is blue, and the missing color value is green, adjacent vertical green color values are averaged and vertical blue color values including a blue color site value provide a correction value.

11. The apparatus of claim 1 wherein, when the preferred orientation is vertical, a color site is green, and the missing color value is red, adjacent vertical red color values are averaged and vertical green color values including a green color site value provide a correction value.

12. The apparatus of claim 1 wherein, when the preferred orientation is vertical, a color site is green, and the missing color value is blue, adjacent vertical blue color values are averaged and vertical green color values including a green color site value provide a correction value.

13. The apparatus of claim 1 wherein, when the preferred orientation is positive diagonal, a color site is green, and the missing color value is red, adjacent positive diagonal red color values are averaged and positive diagonal green color values including a green color site value provide a correction value.

14. The apparatus of claim 1 wherein, when the preferred orientation is positive diagonal, a color site is green, and the missing color value is blue, adjacent positive diagonal blue color values are averaged and positive diagonal green color values including a green color site value provide a correction value.

* * * * *